United States Patent [19]

Graczyk

[11] 4,199,993
[45] Apr. 29, 1980

[54] PRESSURE INDICATOR

[75] Inventor: Edward W. Graczyk, Madison Heights, Mich.

[73] Assignee: J. E. Myles, Inc., Troy, Mich.

[21] Appl. No.: 32,059

[22] Filed: Apr. 23, 1979

Related U.S. Application Data

[63] Continuation of Ser. No. 955,734, Oct. 30, 1978.

[51] Int. Cl.$^2$ .............................................. G01L 7/16
[52] U.S. Cl. ................................................... 73/744
[58] Field of Search ............. 73/744, 745, 746, 146.8, 73/146.3, 146.4

[56] References Cited

U.S. PATENT DOCUMENTS

| | | | |
|---|---|---|---|
| 3,286,726 | 11/1966 | Guy | 73/744 |
| 3,677,089 | 7/1972 | Martin | 73/744 |
| 3,910,120 | 10/1975 | Martin | 73/744 |

*Primary Examiner*—Donald O. Woodiel
*Attorney, Agent, or Firm*—Cullen, Sloman, Cantor, Grauer, Scott & Rutherford

[57] ABSTRACT

The pressure indicator has a body provided with an attachment shank having a pressure fluid passage. A cylinder bore is located at one end of the body communicating with the passage and has a threaded open end. An end plug having a bore and a counterbore is snugly threaded into the open end. A piston is nested in the cylinder bore and has a piston rod axially extending through the cylinder bore and projecting through and outwardly of the plug. A compression spring is interposed between the plug and piston and yieldably biases the piston towards said one end of the cylinder bore. The piston is variably movable longitudinally against the spring on application of pressure to the shank passage. A bearing or bushing is nested within the plug bore and axially and guidably receives the piston rod. The improvement resides in the bushing or bearing having a depending tapered boss of reduced diameter with an annular inclined surface extending downwardly and inwardly at an acute angle, therebeing a counterbore in the bushing and axially of the boss. A cylindrical slide seal of plastic material is nested within the plug bore and projects into the counterbore and boss and depends from the bushing in sealing engagement with the piston rod. An O-ring in the plug bore is sealingly interposed between the plug and the slide seal and in compressed operative registry with the boss and in operative retaining registry with the seal.

9 Claims, 4 Drawing Figures

PRESSURE INDICATOR

This is a continuation of application Ser. No. 955,734, filed Oct. 30, 1978.

BACKGROUND OF THE INVENTION

Pressure indicators of the type disclosed are known to include metallic body with a threaded attachment shank having a pressure fluid passage adapted for connection to a source of pressure to be measured. A cylindrical bore is provided within the body which communicates with the passage and has a threaded open end receiving an end plug having a bore and which is threaded into the body. A piston is nested in the cylinder and has a piston rod axially extending through the cylinder bore and through the plug and a compression spring is interposed between the plug and piston retainingly engaging the piston and the piston being variably movable longitudinally against the spring on application of pressure with the extent of movement providing a visual indication of the pressure applied. Examples of this type of pressure indicator are shown in U.S. Pat. Nos. 3,677,089 and 3,910,120.

In constructions of this type wherein the pressure indicator may be subjected to pressures up to 5,000 PSIG, the problem has long existed of providing a guide bearing and seal for the movable end of the piston rod within the indicator body so as to eliminate binding to, thus, provide an accurate reading of the pressure applied to the pressure indicator.

RELATED APPLICATION

This application relates to an improvement in the pressure indicator in copending patent application executed Sept. 14, 1978, Ser. No. 945,762, filed Sept. 25, 1978, assigned to the Assignee of the present application.

SUMMARY OF THE INVENTION

It is an object of the present invention to provide an improved guide and seal mechanism for the piston rod within the pressure indicator to eliminate or minimize binding of the piston rod with respect to its guide and sealing means, and to provide an improved seal along said rod.

These and other objects will be seen from the following specification and Claims in conjunction with the appended drawings.

THE DRAWINGS

It will be understood that the above drawings illustrate merely preferred embodiments of the invention, and that other embodiments are contemplated within the scope of the claims hereafter set forth.

DETAILED DESCRIPTION OF THE INVENTION

Figure 1:
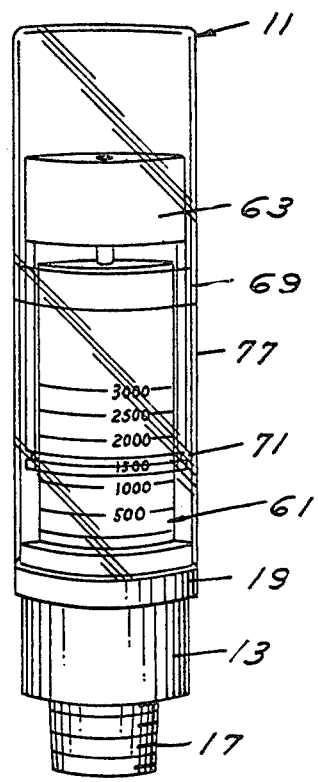
FIG. 1 is a front perspective view of the present pressure indicator.
Figure 2:
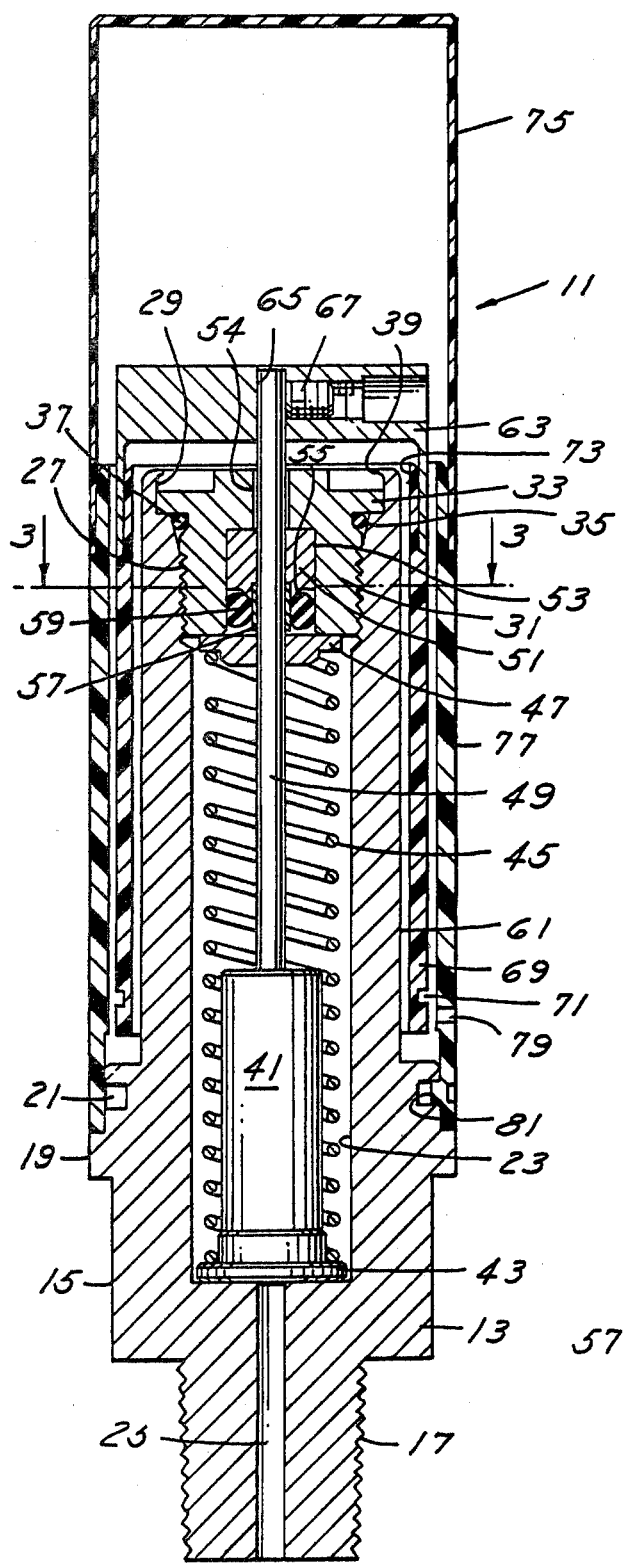
FIG. 2 is a vertical section thereof, on an increased scale.
Figure 3:
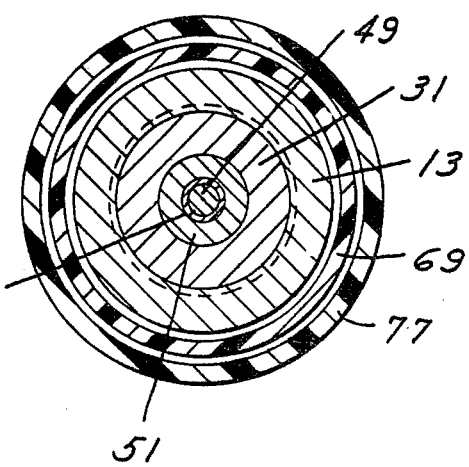
FIG. 3 is a section taken in the direction of arrows 3—3 of FIG. 2.

Referring to the drawings, the pressure indicator or gauge is designated at 11 in FIGS. 1 and 2, and includes an elongated metallic body 13 of cylindrical form having adjacent its lower end on opposite sides thereof a pair of wrench-engaging flats or flat surfaces 15. The body 13 terminates in the threaded assembly shank 17 having therethrough pressure fluid passage 25.

The body 13 includes adjacent the flats 15, an annular stop shoulder 19 and thereabove an annular groove 21 and includes an elongated cylinder bore 23. The upper end of the body 13 has a threaded bore 27 and outwardly thereof a counterbore 29 of increased radius.

End plug 31 is snugly threaded into bore 27 and includes across its top a transverse flange 33 of increased radius. The flange 33 is nested within the counterbore 29 and bears against the adjacent shoulder 34, FIG. 4.

Below the shoulder 34 is an annular inwardly extending tapered surface 35 which is spaced from the plug 31. Within said space and under compression is the O-ring 37 which is snugly interposed between the tapered surface 35 and the plug 31 engaging and being located below top flange 33. This completes the seal between the plug 31 and the body 13.

The upper end of the body 13 adjacent its counterbore 39 has an inturned-portion or stop 39 which is adapted to limit relative outward movement of the flange 33 and plug 31 should an excessive pressure be so applied to the plug. In the event the gauge 11 is overpressurized, the top flange 33 will open to the stop 39 allowing the overpressure to relieve over a controlled orifice area. This provides a safety relief valve feature preventing uncontrolled explosion or missiling in the event the gauge 11 is over-pressurized.

In the present construction, the plug 31 and the threading therein is constructed to have an excessive shear strength such that, the flange 33 of the plug 31 would actually bend before the threads sheared. The pressure indicator 11 has been tested to withstand pressures up to 10,000 PSIG. The normal range of measurement is between 30 inches Hg and 5,000 PSIG in the present embodiment.

Nested within the bore 23 of the body is the elongated piston 41 having at one end the enlarged spring seat 43 of annular form and which supportably engages compression spring 45. The spring 45 is disposed around the piston 41 and is interposed between seat 43 and the apertured spring keeper 47 which underlies plug 31.

The elongated piston rod 49 extends axially of and is an integral part of the piston 41 and is adapted to extend up through plug 31 and the bearing and seal therein and outwardly of the end of the body.

The end plug 31 has a bore 53 and a counterbore 54. Bearing or bushing 51 is nested within bore 53 and has an axial bore 52 to slidably receive the piston rod 49. To minimize or prevent binding between the piston rod 49 and bearing 51, these members are constructed of different materials.

In the illustrative embodiment and preferred form, the bearing 51 is constructed of brass and the piston rod 49 is of stainless steel and has a micro-finish thereon reducing friction and binding. Alternately, the piston rod 49 has a nickel-plating thereon and is highly polished with a micro-finish for this same purpose. The lower end of the bearing 51 has a downwardly and inwardly inclined annular portion 55.

Portion 55 is of reduced diameter relative to bore 53. Its surface is annular and inclined downwardly and inwardly at an acute angle with respect to the axis of the bearing 51. In the illustrative embodiment, said angle is preferably 50° approximately. The angle may be varied between 40 and 60 degrees. Counterbore 56 extends through the tapered boss 55 and into the bearing 51.

Figure 4:
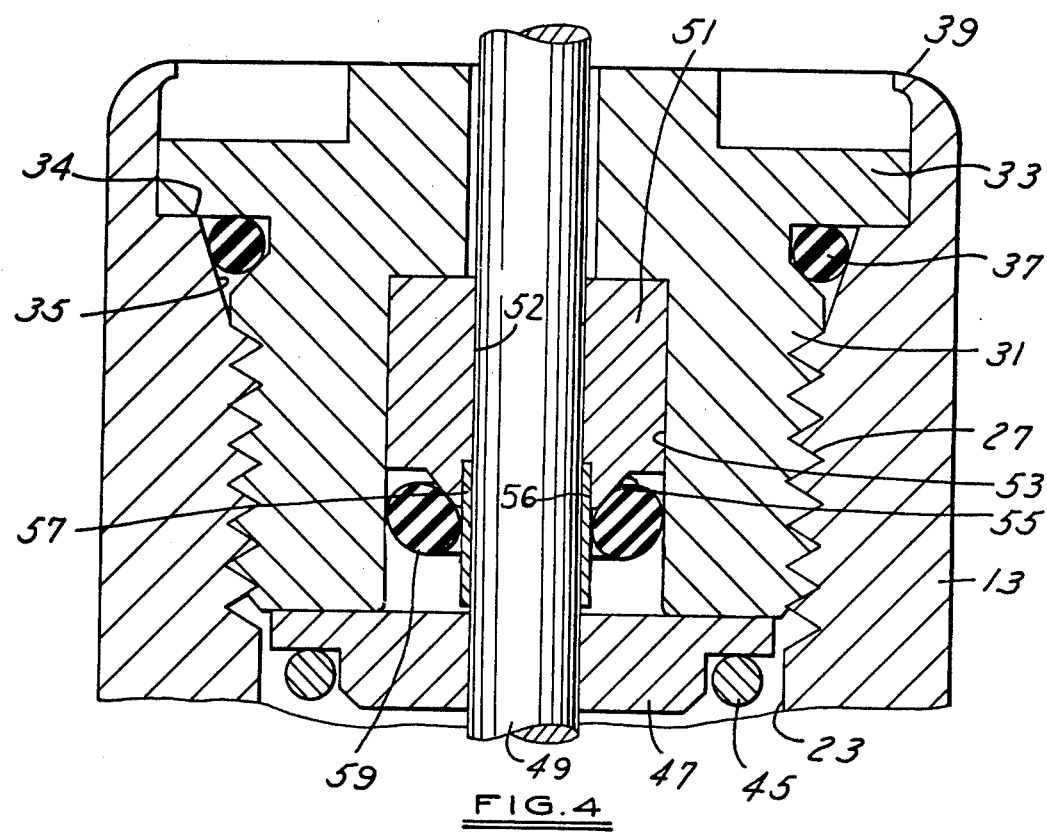
FIG. 4 is a fragmentary elevational section corresponding to FIG. 2 on an increased scale and illustrating the bearing and seal relation to the reciprocal piston rod.

Elongated sealing sleeve or slide seal 57 of a plastic material as, for example, Teflon is snugly and frictionally projected up into counterbore 56 of boss 55 and into the lower end portion of bearing 51 and cooperatively and sealingly receives piston rod 49 as shown on an enlarged scale in FIG. 4. O-ring seal 59 is interposed in compression between the plug 31 and the sealing sleeve 57 to establish a further seal between the rod 49 and the plug 31 to prevent the escape of pressure from the interior of the cylinder bore 23. O-ring 59 is further in compressed operative registry with boss 55 and the seal 57. The acute angular surface of the boss 55 is critical for cooperative relation to O-ring seal 59 in determining the operative sealing engagement of the ring 59 with the seal 57. The preferred acute angle is 50°.

Applied to the exterior surface of the body 13 is the upright scale 61 for measuring pressures between 80 and 5,000 PSIG. In the illustration shown in FIG. 1, the scale indicates merely the pressures 500 to 3,000 PSIG. Additional scales 61 are also applied to the body 61, being 90-degree related therearound whereby, pressure indications may be read throughout 360 degrees. In the present invention, the scale 61 may be replaced to read vacuum up to 30 inches of mercury.

The downwardly opening annular indicator cap 63 has an axial bore 65 receiving the piston rod 49. The cap 63 is secured to the piston rod 49 by the transverse set screw 67, FIG. 2. Elongated upright transparent scale indicator sleeve 69 of a plastic material, at its upper end projects up into the cap 63 and is secured thereto. The indicator sleeve 69 is arranged outwardly of the upper end of the body 13 therearound, overlies the respective scale or scales 61 and has adjacent its lower end the annular scale reader slot 71.

Accordingly upon the application of pressure to the passage 25, there will be a corresponding upward movement of the piston 41 and associated piston rod 49 compressing the spring 45 and effecting a corresponding longitudinal movement of the scale indicator sleeve 69. So variably elevated depending upon the pressures applied, there can be a direct visual reading of the scales 61 through the annular indicator slot 71 viewed from any direction throughout 360 degrees.

The upper end of the scale indicator sleeve 69 has an annular assembly flange 73 which is frictionally or otherwise projected up into the depending flange of the cap 63 so that the indicator sleeve 69 moves in unison with longitudinal adjustments of piston rod 49.

A cylindrical enlarged top enclosure 75 of a plastic material is mounted over and around the body and outwardly of the indicator sleeve 69 surrounding the same. The upper portion of top enclosure 75 may be opaque whereas, the lower part of the enclosure 75 includes plastic transparent enclosure member 77 as a part of or connected to closure 75. The lower end of the top enclosure element 77 includes an internal boss 81 which, in the position shown in FIG. 2, is snapped into and interlocked within annular assembly groove 21 upon the exterior of the body 13, FIG. 2.

A vent aperture 79 is provided through the lower portion of the closure element 77 to permit the movement of atmospheric air to and from the interior of the enclosure upon vertical adjustments of the indicator sleeve 69 and attached cap 63 to avoid any compression of air there within the top enclosure 75-77.

The present pressure indicator may be used for testing the pressure of oils, water, gas, air at high and low temperatures and involving corrosive atmospheres. With piston 41 and spring 45 reversed, the indicator 11 may read vacuum up to 30 inches mercury, for illustration.

Having described my invention, reference should now be had to the following claims.

I claim:

1. In a pressure indicator having a body with an attachment shank with a pressure fluid passage, a cylinder bore at one end communicating with said passage and having a threaded open end, an end plug having a bore and a counterbore snugly threaded into said open end, a piston nested in said cylinder bore having a piston rod axially extending through said cylinder bore and projecting through and outwardly of said plug, and a compression spring interposed at its ends between said plug and piston yieldably retaining said piston at one end of said cylinder bore, said piston being variably movable longtudinally against said spring on application of pressure to said shank passage, the improvement comprising;

a bushing nested within said plug bore having a bore axially and guidably receiving said piston rod and counterbore;

an annular tapered boss of reduced diameter on and depending from said bushing with its outer surface inclined downwardly and inwardly at an acute angle with respect to the axis of said bushing;

said bushing counterbore extending axially through said boss;

a cylindrical slide seal of plastic material within said plug bore and snugly producted into said boss and bushing counterbore and depending from said boss in sealing engagement with said piston rod within said bushing and boss, and below said boss; and an O-ring in said plug bore sealingly interposed between said plug and slide seal and in operative compressive engagement with the angular surface of said boss;

said angular boss surface providing for increased operative sealing and pressure engagement of said O-ring between said plug and seal.

2. In the pressure indicator of claim 1, said piston rod being of a material different from said bushing thereby eliminating binding therebetween.

3. In the pressure indicator of claim 1, said piston rod being of stainless steel.

4. In the pressure indicator of claim 1, said piston rod having a highly polished microfinish.

5. In the pressure indicator of claim 1, a nickel-plated layer applied to said piston rod.

6. In the pressure indicator of claim 1, said body longitudinally inward of said shoulder having an annular tapered surface spaced from said plug below said top flange;

and an O-ring seal compressively nested between said tapered surface and plug.

7. In the pressure indicator of claim 1, the acute angle of the tapered surface of said bushing boss being 50 degrees approximately.

8. In the pressure indicator of claim 1, the acute angle of the tapered surface of said bushing boss being in the range of 40 to 60 degrees approximately.

9. In the pressure indicator of claim 1, said body outwardly of its threaded end having a counterbore of increased diameter defining a stop shoulder;

a transverse top flange on said end plug nest in the counterbore of said body and bearing against said shoulder;

end portions of said body at said counterbore being inturned limiting relative outward movement of said top flange relative to said body, whereby application of an over-pressure to said plug is relieved over a controlled orifice area providing a safety relief.

* * * * *